United States Patent [19]
Nishikawa et al.

[11] Patent Number: 4,570,770
[45] Date of Patent: Feb. 18, 1986

[54] CONTROL SYSTEM FOR AUTOMATIC TRANSMISSIONS FOR VEHICLES

[75] Inventors: Masao Nishikawa, Tokyo; Shinzo Sakai, Kamifukuoka; Takashi Aoki, Fujimi, all of Japan

[73] Assignee: Honda Giken Kogyo Kabushiki Kaisha, Tokyo, Japan

[21] Appl. No.: 547,195

[22] Filed: Oct. 31, 1983

[51] Int. Cl.⁴ .................. B60K 45/02; B60K 41/28
[52] U.S. Cl. ...................... 192/0.052; 192/0.076; 192/3.3; 192/3.31; 192/103 R
[58] Field of Search .................. 192/0.052, 0.076, 3.29, 192/3.3, 3.31, 103 R

[56] References Cited
U.S. PATENT DOCUMENTS

| | | | |
|---|---|---|---|
| 3,058,373 | 10/1962 | Snoy et al. | 192/3.3 X |
| 3,805,640 | 4/1974 | Schneider et al. | 192/3.31 X |
| 4,476,970 | 10/1984 | Ito | 192/0.052 |
| 4,507,985 | 4/1985 | Morimoto et al. | 192/3.31 X |

FOREIGN PATENT DOCUMENTS

| | | | |
|---|---|---|---|
| 2503308 | 10/1982 | France | 192/3.29 |
| 167953 | 12/1981 | Japan | 192/3.29 |

Primary Examiner—Allan D. Herrmann
Attorney, Agent, or Firm—Armstrong, Nikaido, Marmelstein & Kubovcik

[57] ABSTRACT

A control system for an automatic transmission for a vehicle with an electric vehicle speed detector, the automatic transmission including a torque converter with a semi-direct coupling mechanism hydraulically controllable of the degree of coupling.

The control system comprises a signal processing circuit for processing an electrical vehicle speed signal to provide an electric control signal, and an electro-magnetic valve mechanism for selectively supplying a multi-staged hydraulic control pressure to the semi-direct coupling mechanism in accordance with the electric control signal.

Automatic transmissions of the above type are applied to a vehicle with an electric vehicle speed detector, without any major change of existing production system and at an inexpensive cost.

14 Claims, 5 Drawing Figures

CONTROL SYSTEM FOR AUTOMATIC TRANSMISSIONS FOR VEHICLES

BACKGROUND OF THE INVENTION

1. Field of the Invention

The present invention relates to a control system for automatic transmissions for vehicles. Particularly, it relates to a control system for an automatic transmission for vehicles, the automatic transmission including a hydraulic torque converter having input and output shafts thereof capable of a direct mechanical coupling therebetween with a degree of coupling in accordance with the hydraulic control pressure applied thereto.

2. Description of Relevant Art

In an automatic transmission for vehicles including a hydraulic torque converter, it is favorable from the viewpoint of possible improvements in fuel consumption and vibration reduction to provide a mechanical coupling, to thereby prevent fluid slip, when the torque converter reaches the state where its proper function of torque multiplication is no longer necessary. Though desireable at a vehicle speed as low as possible, the direct coupling if effected at a low vehicle speed will very substantially reduce the number of revolutions of an engine, and enlarge the torque variation of the engine, thus instead increasing the vibration of a vehicle body, with the result being opposite the desired reduction of vibration.

To effect the direct coupling from a low vehicle speed to achieve a favorable fuel consumption rate, while avoiding the above problem, the applicant of the present invention has already proposed a semi-direct coupling mechanism capable of increasing an engagement force thereof with the vehicle speed. According to this proposal, in a low vehicle speed range having a relatively large torque variation, the semi-direct coupling mechanism is permitted to slip little by little at peak points of the variation, thus having an attentuation effect on the vibration, so that the initially intended object has been fully achieved.

To put the proposal into practice, there has been needed a vehicle speed detector of a hydraulic type having an oil pressure output increasing in proportion to the vehicle speed. In most hydraulically controlled automatic transmissions, which are provided with such a vehicle speed detector, the proposal has been and is well applicable. However, in the cases of semi-automatic transmissions or full-automatic transmissions of electronic control types without such a vehicle speed detector, a vehicle speed detector of such type has been needed to be additionally provided. This has been a significant problem when producing automatic transmissions with the semi-direct coupling mechanism by using an existing production line.

The present invention has been achieved to favorably solve such problems.

SUMMARY OF THE INVENTION

According to the present invention, there is provided a control system for an automatic transmission for a vehicle with a vehicle speed detector for providing an electrical vehicle speed signal and a hydraulic pressure source for supplying a predetermined hydraulic pressure. The automatic transmission includes a hydraulic torque converter having input and output shafts thereof capable of a direct mechanical coupling therebetween by a degree of coupling in accordance with a hydraulic control pressure, comprising a signal processing circuit for processing the vehicle speed signal to give an electrical control signal and an electro-magnetic valve mechanism, interposed between the hydraulic pressure source and the torque converter, for converting the predetermined hydraulic pressure into a plurality of predetermined output control levels in accordance with the control signal.

An object of the present invention is to provide a control system which favorably permits an automatic transmission provided with a hydraulic torque converter having input and output shafts thereof capable of a direct mechanical coupling therebetween with a degree of coupling in accordance with a hydraulic control pressure to be applied, without any large and expensive changes in existing production and service systems, in a vehicle having a vehicle speed detector for electrically detecting the vehicle speed and a hydraulic pressure source for supplying a predetermined hydraulic pressure.

The above and further features, objects and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
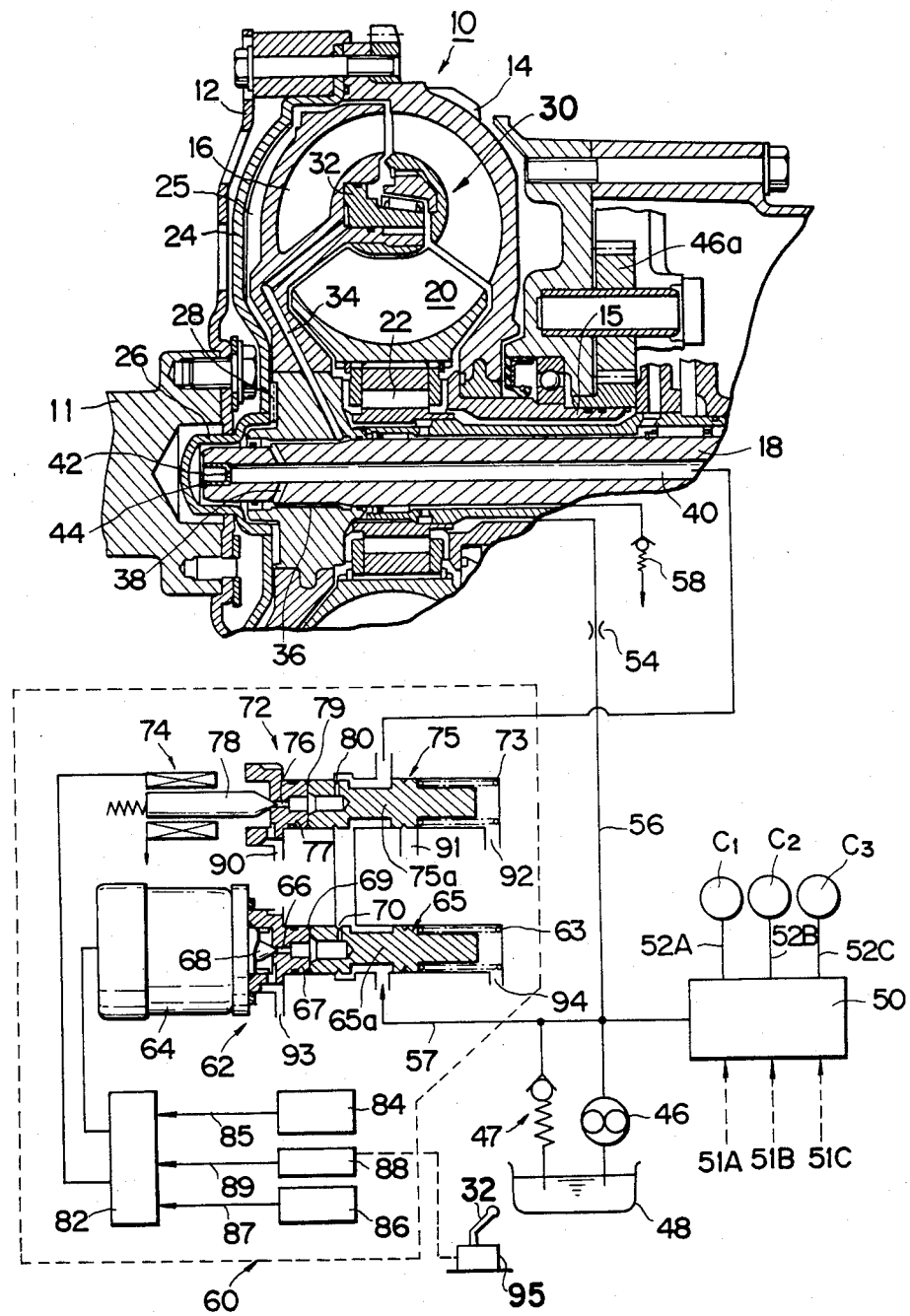
FIG. 1 is a system diagram of an automatic transmission for vehicles provided with a control system according to a preferred embodiment of the present invention.

Referring first to FIG. 1, designated at reference character 10 is a hydraulic torque converter. The torque converter 10 has the power supplied from an engine (not shown) input from a crankshaft 11 and output from an output shaft 18 through one of the shiftable gear trains (not shown) to a pair of drive wheels (not shown). Namely, the engine power is supplied to a vaned impeller 14 direct-coupled through a disk plate 12 with the crankshaft 11, and the power is transmitted to a bladed turbine 16 hydraulically coupled with the impeller 14 and then to the output shaft 18 on which the turbine 16 is fitted in a splined manner. The hydraulic coupling between the impeller 14 and the turbine 16 continuously multiplies the torque or reduces the speed of rotation, that is, the fluid delivered from the impeller 14 enters into the turbine 16, while rotating the same, then into a bladed stator 20, where it is deflected and redirected to the impeller 14, whereas the change in the flow direction at the stator 20 serves as an increment of fluid torque to increase the output torque of the converter 10.

The bladed stator 20 is mounted on a one-way clutch 22 so that, as the output shaft 18 approaches the speed of rotation of the crankshaft 11, the stator 20 rotates in the same direction as the impeller 14, thus reducing the effect of torque multiplication.

Between the impeller 14 and the turbine 16, there is interposed a semi-direct coupling clutch 30 provided with a piston 32 by operation of which, when hydraulically urged to the right in FIG. 1, the turbine 16 becomes directly coupled with the impeller 14 in accordance with the hydraulic pressure exerted as a control signal, so that the torque is mechanically transmitted to the output shaft 18 in the driving direction only. The semi-direct coupling clutch 30 has its details described in Japanese patent application No. 55-157263 filed by the assignee of the present invention, and in the corresponding U.S. Pat. No. 4,457,413.

The hydraulic controlled pressure supply for the piston 32 of the semi-direct coupling clutch 30 is effected through a plurality of oil paths 34 formed in the turbine 16, a gap 36 defined between the turbine 16 and the output shaft 18, a plurality of inclined slots formed in the output shaft 18 and an oil path 40 formed through the output shaft along the centerline thereof.

The vaned impeller 14 is integrally formed with a cover 24 tightly enclosing the entire inner fluid space 25 of the torque converter 10. The cover 24 has a shaft bearing 26 provided at the central part thereof for bearing the output shaft 18 and a metal thrust bearing 28 for supporting, when the semi-direct coupling clutch 30 is operated, the reaction of the operation in the axial direction of the torque converter 10. Each of the bearings 26, 28 has at least one oil slot (not shown) formed therein.

Moreover, at the left end of the output shaft 18, a blind plug 44 is inserted having an orifice 42 formed therethrough to hydraulically connect the oil path 40 with the inner fluid space 25 of the torque converter 10.

The vaned impeller 14 is direct-coupled at the right end thereof with a sleeve member 15 loosely fitted on the output shaft 18, which sleeve member 15 is adapted to drive gear 46a of an oil pump 46 shown in a lower position of FIG. 1 as a hydraulic pressure source for pumping hydraulic oil of an oil reservoir 48 to send a part thereof to a hydraulic control circuit 50.

The hydraulic control circuit 50, receives as input signals thereof the following: a position signal 51A based on the shift position of a shift lever 95, a vehicle speed signal 51B based on the vehicle speed, and an opening signal 51C based on the degree of opening of a throttle valve (not shown). Hydraulic control circuit 50 selectively provides three output signals 52A, 52B and 52C in the form of a hydraulic pressure for operating one of three friction engagement elements C1, C2 and C3 installed as clutch means in the gear trains for establishing the gear ratios of first, second and third speeds, respectively. The friction engagement elements C1, C2 and C3 may comprise multi-plate clutches or band brakes.

The hydraulic oil delivered from the oil pump 46 is partly introduced through an oil line 56 including an orifice 54 to the inner fluid space 25 of the torque converter 10 and, therefrom, through a check valve 58 further to an oil cooler (not shown), where it is cooled before returning to the oil reservoir 48.

Moreover, the remaining hydraulic oil from the oil pump 46 is let to pass through a branch line 57, while having the pressure controlled with an electronic control system 60 installed in the branch line 57, and output as the before-mentioned hydraulic control signal to the oil path 40.

The electronic control system 60 comprises first and second electro-magnetic valves 62, 72 of a pilot type connected in series relative to each other, an electronic circuit 82 for controlling the electro-magnetic valves 62, 72 and a vehicle speed detector 84, a throttle opening detector 86 and a shift position detector 88 which output a vehicle speed signal 85, a throttle opening signal 87 and a shift position signal 89 to the electronic circuit 82, respectively.

Moreover, the first and second electro-magnetic valves 62, 72 comprise first and second solenoid mechanisms 64, 74 and first and second spool valve mechanisms 65, 75, respectively.

Further, the first and second spool valve mechanisms 65, 75 comprise spool members 65a, 75a, each slidable leftwardly and rightwardly in FIG. 1, springs 63, 73 for normally biasing of the spool members 65a, 75a in open directions thereof (that is, each is biased to the left in FIG. 1), valve seat members 67, 77 adapted for the seating of the spool members 65a, 75a at open positions thereof (each at the left end thereof in FIG. 1), and hydraulic chambers 69, 79 defined between the spool members 65a, 75a and the corresponding valve seat members 67, 77. The hydraulic chambers 69, 79 have inner pressure exerted to urge the spool members 65a, 75a in the closed directions thereof, that is, each to the right in FIG. 1, respectively.

Furthermore, the hydraulic chamber 69 of the first electro-magnetic valve 62 has an orifice 70 formed in the spool member 65a for introducing the output pressure of the first electro-magnetic valve 62, as the spool member 65a is moved to the open position thereof, and the input pressure thereof, as it is in the closed position thereof. Another orifice 66 is formed in the valve seat member 67 for communicating through a port 93 with the oil reservoir 48. The hydraulic chamber 79 of the second electro-magnetic valve 72 has an orifice 80 formed in the spool member 75a, the orifice 80 being adapted to introduce the input pressure of the second electro-magnetic valve 72 when the spool member 75a is put in the open position thereof and to close when it is in the closed position thereof. Orifice 76 is formed in the valve seat member 77 for communicating through a port 90 with the oil reservoir 48. Respectively when the spool members 65a, 75a are put in the closed positions thereof, in the first electro-magnetic valve 62, the hydraulic chamber 69 is caused to deliver an output pressure to the second electro-magnetic valve 72 and, in the second electro-magnetic valve 72, a port 91 leading to the oil reservoir 48 is caused to communicate with the oil path 40 formed in the output shaft 18. Namely, the first and second electro-magnetic valves 62, 72 function as pressure select valve and an on-off control valve, respectively.

Still more, the first and second solenoid mechanisms 64, 74 cause, normally or when not energized, their mobile cores 68, 78 to close the orifices 66, 76 of the hydraulic chambers 69, 79 and, when energized, to open them, respectively.

Therefore, when the mobile core 68 is caused to move to the right in FIG. 1 with the first solenoid mechanism 64 de-energized thus closing the orifice 66 of the first spool valve mechanism 65, also noting that the spool member 65a will be urged, with hydraulic pressure developed in the hydraulic chamber 69, to the right to the closed position thereof, opposing the spring 63, so that a hydraulic pressure balancing a relatively strong preset pressure of the spring 63 will be output to the second electro-magnetic valve 72. When the mobile core 68 is pulled back to the left with the first solenoid mechanism 64, energized, opening the orifice 66, spool member 65a will be pushed back to the open position thereof by the spring 63. Thus, the input pressure of the first electro-magnetic valve 62, that is, the hydraulic pressure in the branch line 57 is input to the second electro-magnetic valve 72, when the second solenoid mechanism 74 is de-energized, causing the mobile core 78 to close the orifice 76, spool member 75a will be pushed away, with hydraulic pressures developed in the hydraulic chamber 79, to the closed position thereof, opposing the spring 73 having a relatively weak preset pressure. Thus, the hydraulic oil in the oil path 40 is communicated through the port 91 to return to the oil reservoir 48, thereby releasing the semi-direct coupling clutch 30. But when the solenoid mechanism 74 is energized, opening the orifice 76, spool member 75a will return to the open position.

In FIG. 1, ports 92, 94 communicate with the oil reservoir 48, respectively, and relief valve 47, when the delivery pressure of the oil pump 46 becomes excessive relative to a predetermined value therefor, will release the excess to the oil reservoir 48.

Further to the foregoing description, in the electronic circuit 82, there is incorporated an operational function for conducting electric currents to the first and second solenoid mechanisms 64, 74 in accordance with the vehicle speed signal 85, the throttle opening signal 87 and the shift position signal 89 to properly operate the first and second electro-magnetic valves 62, 72, thus rendering the semi-direct coupling clutch 30 directly coupled in a one-way manner. When considered as an assembly of operation maps (see FIGS. 2-4) having their output ranges of control operation signal visualized with respect to the combination of input signals, the above-mentioned operational function comprises a first/second speed operation map and a third speed operation map to be selected when the shift position signal 89 has a signal state thereof corresponding to a first or second speed position of the shift lever and to a third speed position thereof, respectively.

Figure 2:
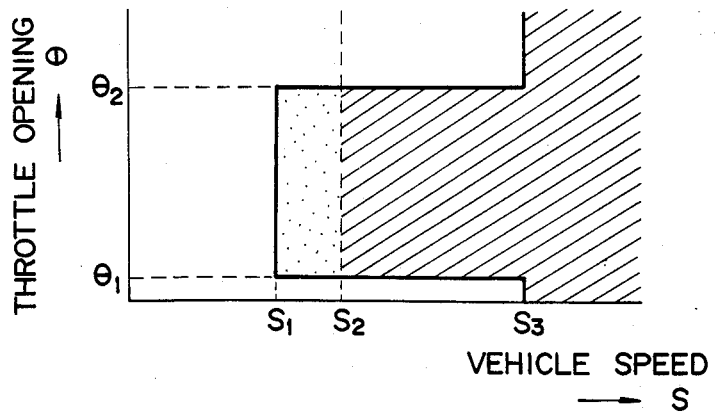
FIG. 2 is an operation map for a third speed running of the control system of FIG. 1.
Figure 3:
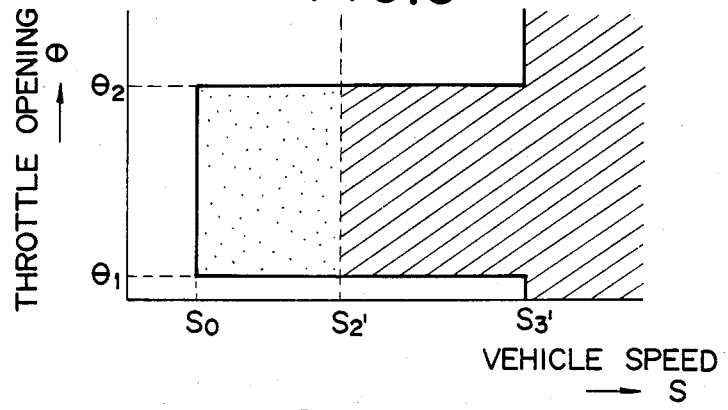
FIG. 3 is an operation map for a first/second speed running of the control system of FIG. 1.

Referring now to FIG. 2, showing the third speed operation map, and to FIG. 3, showing the first/second speed operation map, in both cases, represented at the abscissa is a vehicle speed S and the ordinate is a throttle opening degree $\theta$. Defined by the broken and solid lines extending vertically are low-speed side boundaries of operating regions of the first and second electro-magnetic valves 62, 72. Accordingly, respective hatched portions represent the operating region of both the first and second electro-magnetic valves 62, 72 and respective dotted portions represent that of only the second electro-magnetic valve 72. Namely, in the state where the shift lever is put in the third speed position, the first solenoid mechanism 64 will be energized irrespective of the degree of throttle opening $\theta$ for running vehicle speed S above a preset vehicle speed S2, and the second solenoid mechanism 74 will be energized for running vehicle speeds S between preset vehicle speeds S1 and S3 when the degree of throttle opening $\theta$ resides between preset openings $\theta1$ and $\theta2$ and for running vehicle speeds S above preset vehicle speed S3 irrespective of the degree of throttle opening $\theta$. In the cases of the first and second speed positions, the first solenoid mechanism 64 is energized irrespective of the degree of throttle opening for running vehicle speeds S above a preset running vehicle speed S2', and the second solenoid mechanism 74 becomes energized for running vehicle speeds S between preset vehicle speeds S0 and S3' when the degree of throttle opening $\theta$ is between the preset openings $\theta1$ and $\theta2$ and for running vehicle speeds S above the preset vehicle speed S3' irrespective of the degree of throttle opening.

In this embodiment of the invention, the vehicle speeds S2 and S2', as well as S3 and S3', are preset to be equal to each other, while they may have different values as circumstances require.

Figure 5:
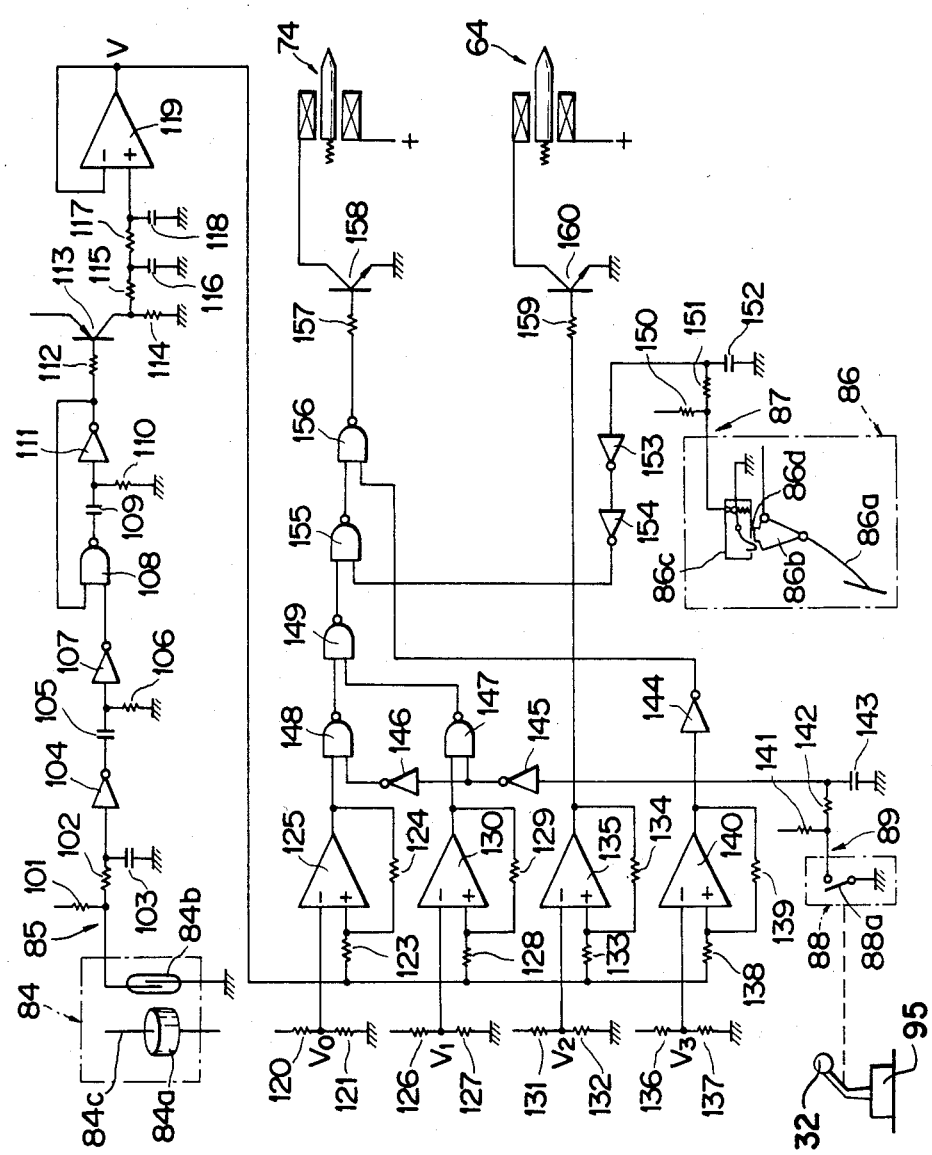
FIG. 5 is a control circuit diagram of the control system of FIG. 1.

Referring now to FIG. 5, there will be described hereinbelow the electronic circuitry and function of the electronic control system 60.

In the upper left part of FIG. 5, a magnet 84a is provided on a speedometer cable 84c. The magnet 84a constitutes, together with a reed switch 84b, the vehicle speed detector 84 which outputs the vehicle speed signal 85 in the form of a pulse signal based on open and close actions of the reed switch 84b, depending on the number of revolutions of the speedometer cable 84c.

The vehicle speed signal 85 is integrated by means of a resistor 102 and a condenser 103 and the signal is conducted through an inverter 104 to a combination of a condenser 105 and a resistor 106 to have a differential wave thereof input through another inverter 107 to either input terminal of a two-input NAND gate 108. The output of NAND gate 108 is differentiated by a combination of a condenser 109 and a resistor 110 and then inverted through an inverter 111 before again feeding back to the other input terminal thereof. This feedback signal, that is, an output of the inverter 111 is also input through an input resistor 112 to a transistor 113, where it is amplified, and output from an output resistor 114 thereof through a combination of resistors 115, 117 and condensers 116, 118, thus being smoothed, to a differential amplifier 119 becoming a voltage V proportional to the running vehicle speed S.

On the other hand, respectively, those voltages V0, V1, V2 and V3 corresponding to the preset vehicle speeds S0, S1, S2 (S2') and S3 (S3') are obtained by way of a voltage distribution using combinations of resistors 120 and 121; 126 and 127; 131 and 132; and 136 and 137 respectively and then input to minus terminals of differential amplifiers 125, 130, 135 and 140. The above-mentioned voltage V proportional to the running vehicle speed S is input through resistors 123, 128, 133, and 138 to the plus terminals of the differential amplifiers 125, 130, 135 and 140. The outputs of the differential amplifiers 125, 130, 135 and 140 are connected to the corresponding plus terminals thereof through resistors 124, 129, 134 and 139, so that when any of the preset vehicle speeds S0, S1, S2 and S3 are exceeded by the running vehicle speed S, the corresponding differential amplifier 125, 130, 135 or 140 will have an output of a "high" level.

Moreover, at the shift position detector 88 shown in the lower left part of FIG. 5, a contact 88a closes when the shift lever 95 is put in the third speed position and opens when it is in the first or second position. In accordance with this on-off action of the contact 88a, the shift position signal 89 is generated in the form of a plain pulse by means of a combination of a resistor 142 and a condenser 143.

Further, the throttle opening detector 86 shown in the lower right part of FIG. 5 has a cam member 86b provided on an acceleration pedal 86a and a micro-switch 86c operable with the cam member 86b. A contact 86d of the micro-switch 86c opens when the degree of throttle opening resides between the preset opnings $\theta 1$ and $\theta 2$ and closes anytime else. In accordance with this on-off action of the contact 86d, the throttle opening signal 87 is generated in the form of a plain pulse by means of a combination of a resistor 151 and a condenser 152.

The output terminal of the differential amplifier 135, corresponding to the preset vehicle speed S2, is connected through a resistor 159 and a transistor 160, without being influenced by the throttle opening signal 87 or the shift position signal 89, to the first solenoid mechanism 64. Therefore, when the running vehicle speed S exceeds the preset vehicle speed S2 (S2'), thus rendering the output of the differential amplifier 135 a "high" level, the transistor 160 becomes conductive and the first solenoid mechanism 64 becomes excited irrespective of the degree of throttle opening $\theta$ in any of the cases where the shift lever 95 is put in the first, second and third speed positions, respectively.

Referring further to FIG. 5, there will be described hereinbelow the operation mode of the second solenoid mechanism 74 in conjunction with the shift lever position.

The above-mentioned shift position signal 89 is input to an inverter 145. The output of inverter 145 is provided via another inverter 146 to either input terminal of a two-input NAND gate 148 (the other input terminal of which is supplied with an output of the differential amplifier 125), and directly to either input terminal of another two-input NAND gate 147. The other input terminal of NAND gate 147 is supplied from the output of the differential amplifier 130. Respective outputs of these NAND gates 147, 148 are input each to an input terminal of a two-input NAND gate 149.

Moreover, the throttle opening signal 87 is input through two inverters 153, 154 to either input terminal of a two-input NAND gate 155, of which the remaining input terminal is supplied with an output of the NAND gate 149. The output of NAND gate 149 is provided to either input terminal of another two-input NAND gate 156, which is supplied at the other input terminal thereof with an output of the differential amplifier 140 as inverted through an inverter 144. NAND gate 156 has an output thereof communicated through a resistor 57 to a transistor 158, which becomes conductive when the input signal thereof is at a "high" level, thus energizing the second solenoid mechanism 74.

Again in FIG. 5, resistors 101, 141 and 150 supply the signal power of the vehicle speed signal 85, the shift position signal 89 and the throttle opening signal 87.

In the above-described circuitry, while the shift lever 95 is put in the first or second position, thus keeping the contact 88a opened, the shift position detector 88 has an output of a "high" level. For this reason, the output of the inverter 145 is kept at a "low" level and the output of the NAND gate 147, which becomes a "low" level only when both inputs thereof are a "high" level, maintains a "high" level irrespective of the output level of the differential amplifier 130. Because the output of the amplifier 125 becomes a "high" level when running vehicle speeds S are higher than the preset vehicle speed S0, and due to that of the inverter 146 kept at a "high" level, the NAND gate 148 outputs a "low" level when the running speed S is above the preset speed S0, thus rendering the output of the NAND gate 149 a "high" level for the speeds S above S0. Accordingly, when the degree of throttle opening $\theta$ resides between the preset openings $\theta 1$ and $\theta$ 2, that is, when the contact 86d of the micro-switch 86c is opened, the two inputs of the NAND gate 155 will both have a "high" level. Therefore the output of NAND gate 155 is a "low" level, so that the NAND gate 156 receiving this "low" output level at either input terminal thereof provides a "high" level output. Namely, when the degree of throttle opening $\theta$ is standing between the preset openings $\theta 1$ and $\theta 2$, while the shift lever is shifted in the first or second speed position, the second solenoid mechanism 74 will be energized for the running vehicle speeds S above the preset vehicle speed S0. However, in the range of the running speeds S exceeding the preset speed S3 (S3'), in which the differential amplifier 140 outputs a "high" level, thus rendering the output of the inverter 144 a "low" level, the input of the NAND gate 156 will be always maintained at a "high" level, and hence the second solenoid mechanism 74 will be kept energized irrespective of the degree of throttle opening $\theta$.

Also, in the case where the shift lever 95 is put in the third speed position, the operation mode is explainable in a similar manner. In this case, the second solenoid mechanism 74 is energized for the running vehicle speeds S between the preset vehicle speeds S1 and S3 (S3') when the degree of throttle opening resides between the preset openings $\theta$ 1 and $\theta$ 2 and for the running speeds S above the preset speed S3 irrespective of the degree of throttle opening $\theta$.

The function of the electronic circuit 82 as described above, sets forth the operation mode of the first and second solenoid mechanisms 64, 74. As is apparent from the above description, the electronic circuit 82 shown in FIG. 5 comprises a random logic circuit, whereas the above-mentiond function may be performed with a programmed control system, such as a microcomputer system.

As will be understood from the foregoing description, when the vehicle is running with the shift lever 95 in the third speed position for example, while the running vehicle speed S is below the preset vehicle speed S1, neither the first nor the second solenoid mechanisms 64, 74 will be energized. In the second electro-magnetic valve 72, the spool member 75a will be moved with the inner pressure of the hydraulic chamber 79 to the right in FIG. 1, opposing the spring 73, thus closing the first spool valve mechanism 75 relative to the oil path 40. Therefore, the delivery pressure of the oil pump 46 will not be transmitted to the oil path 40 which will then, to the contrary, communicate through the port 91 of this electro-magnetic valve 72 with the oil reservoir 48, thus being kept substantially at the atmospheric pressure, so that the semi-direct coupling mechanism 30 becomes released with the piston 32 brought to the extreme left in FIG. 1, in response to inner fluid pressures acting on the right end face thereof, thereby permitting the torque converter 10 to put in effect the torque multiplication.

In the state where the running vehicle speed S is above the preset vehicle speed S1 but below the preset vehicle speed S2, while the degree of throttle opening $\theta$ is kept between the preset openings $\theta$ 1 and $\theta$ 2, and where the first solenoid mechanism 64 is de-energized but the second solenoid mechanism 74 is energized, the second electro-magnetic valve 72 will be opened, thus leading the output pressure of the first electro-magnetic valve 62 to the oil path 40 and thereby causing the semi-direct coupling mechanism 30 to be engaged. The hydraulic pressure for this engagement depends on the spring 63 of the first electro-magnetic valve 62, whereas the preset pressure of the spring 63 is relatively high, and correspondingly the output pressure balancing this preset pressure is as high, so that the oil path 40 is supplied with hydraulic pressure sufficiently high to cause the semi-direct coupling mchanism 30 to be engaged, opposing the inner fluid pressure of the torque converter 10. In this concern, the spring 73 of the second electro-magnetic valve 72 is preset to be far weaker than the spring 63 of the first electro-magnetic valve 62.

For example, the springs 63, 73 may be preset so that the first electro-magnetic valve has an output pressure of 6.0 kg/cm$^2$ and the second electro-magnetic valve 72 has an output pressure between 2.5 to 3 kg/cm$^2$. Correspondingly, in torque converter 10, the inner fluid pressure may be preset from 3.5 to 4.0 kg/cm$^2$ for a normal service by use of the orifice 54 and the check valve 58. In this case, in the dotted regions of FIGS. 2 and 3, the semi-direct coupling mechanism 30 will undergo an engagement pressure, from 2.0 to 2.5 kg/cm$^2$, which is equal to the difference between the inner fluid pressure of the torque converter 10 and the output pressure of the first electro-magnetic valve 62.

Moreover, in the hatched region, in which the first solenoid mechanism 64 is also energized, thus opening the orifice 66 and thereby substantially losing effective hydraulic pressures acting on the left end face of the spool member 65a, the oil pump 46 will have delivery pressure thereof controlled by the relief valve 47 and communicated through the two opened electro-magnetic valves 62, 72 to the semi-direct coupling mechanism 30, which pressure may be as high as 7.5 to 8.0 kg/cm$^2$, for example, so that the engagement pressure will be much stronger than that of the former example.

Therefore, according to the present embodiment, in the vehicle speed range between the preset speeds S1 and S2, where the engine vibration is relatively large, the engagement pressure of the semi-direct coupling mechanism 30 can be made weak to facilitate the slipping and to permit the direct-coupling to be effected at a relatively low vehicle speed while avoiding the vibration problem. Further, in the vehicle speed range above the preset speed S2 where the road resistance as well as the air resistance is increased with the raised running vehicle speed S and engine power corresponding thereto is transmitted through the semi-direct coupling mechanism 30, the engagement pressure can be made strong to favorably prevent unnecessary slipping.

In the present embodiment, in which the vehicle speeds S2, S2' and S3, S3' are preset so that S2=S2' and S3=S3' for the simplification of the control system, the former two S2, S2' may preferably in respect of the function, be such that S2>S2'.

Moreover, the present embodiment, which is adapted for a semi-automatic transmission system including a shift lever 95 manually shiftable among three shift positions and hence in which the hydraulic control circuit 50 substantially relies on no more than the position signal 51A to selectively operate the friction engagement elements C1, C2 and C3, may be applied to a full-automatic three-speed transmission system substantially accompanying no manual operation of a shift lever. In such case, the hydraulic control circuit 50 will function so as to properly operate the friction engagement elements C1, C2 and C3 in accordance with the vehicle speed signal 51B and the opening signal 51C.

Figure 4:
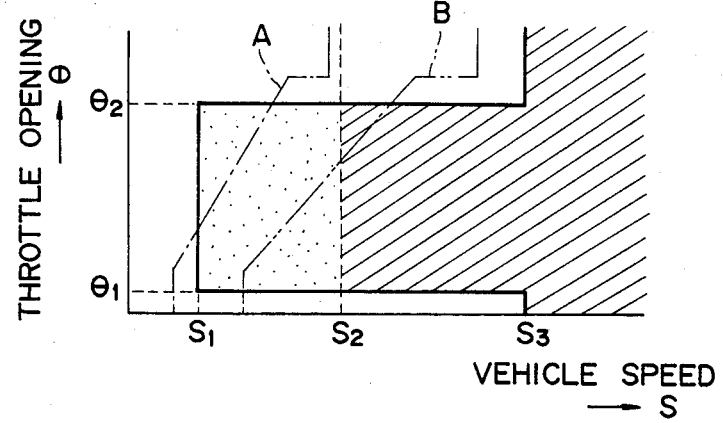
FIG. 4 is an operation map for a full-automatic transmission system to which the control system of FIG. 1 is applicable.

Referring now to FIG. 4, which is a characteristic chart including a speed shift map of such full-automatic transmission system overlapped on the operation map of the semi-direct coupling mechanism 30. Defined on the left of a bent line A is a region for running at the first speed; on the right of a bent line B, at the third speed; and between the bent lines A and B, at the second speed. Still in this case, the electronic control system 60 has the same control logic as that of the operation map of FIG. 2 and, therefore, the engagement pressure for the semi-direct coupling mechanism 30 becomes relatively weak in the dotted region and relatively strong in the hatched region, thus achieving the initially intended object.

Further, with respect to the present embodiment, which is adapted for a semi-automatic transmission of a forward three-speed type in the foregoing description, it is apparent that the application is possible also to other types such as a forward four-speed type.

Still further, in respect to the present embodiment, in which the engagement mechanism 30 is selectively controlled at two levels, for example, it is also possible to effect a multi-staged selection control by providing a plurality of electro-magnetic valves similar to the first electro-magnetic valve 62.

Although there have been described what is at present considered to be the preferred embodiment of the invention, it will be understood that the present invention may be embodied in other specific forms without departing from the spirit or essential characteristics thereof. The present embodiment is, therefore, to be considered in all respects as illustrative and not restrictive. The scope of the invention is indicated by the appended claims rather than by the foregoing description.

We claim:

1. A control system for an automatic transmission for a vehicle with a vehicle speed detector providing an electrical vehicle speed signal and a hydraulic pressure source for supplying a predetermined hydraulic pressure, the automatic transmission including a hydraulic torque converter having an input and an output shaft, comprising:
   a signal processing circuit for processing the electrical vehicle speed signal and generating an electrical control signal;
   an electro-magnetic valve means, interposed between the hydraulic pressure source and the torque converter, for converting the predetermined hydraulic pressure into a plurality of levels in response to said control signal to produce the control pressure; and
   a coupling means for providing a direct mechanical coupling between the input and output shafts in response to said control pressure and with the degree of coupling being in proportion to the magnitude of said pressure.

2. A control system according to claim 1, the vehicle having a shift position detector for electrically detecting the shift position of a shift lever to output a shift position signal, wherein:
   said control signal further depends on the shift position signal.

3. A control system according to claim 2, the vehicle further having a throttle opening detector for electrically detecting the degree of opening of a throttle valve to output a throttle opening signal, wherein:
   said control signal further depends on the throttle opening signal.

4. A control system according to claim 1, wherein:
   said electro-magnetic valve means comprises at least one first electro-magnetic valve connected with the hydraulic pressure source and adapted for alternatively providing two hydraulic pressures, and a second electro-magnetic valve connected in series with said first electro-magnetic valve and adapted for hydraulically effecting an on-off control.

5. A control system according to claim 4, wherein:
said first electro-magnetic valve comprises a solenoid mechanism which is energized in response to said control signal, and a spool valve mechanism actuatable to open and close with said solenoid mechanism;
said spool valve mechanism comprises a spool member, a spring member normally biasing one end face of said spool member in the open direction of said spool valve mechanism, and a hydraulic chamber defined by the other end face of said spool member; and
said hydraulic chamber has a first orifice for introducing an output pressure of said first electro-magnetic valve and an input pressure thereof when said spool valve mechanism is opened and closed, respectively, and a second orifice communicating with atmospheric pressure and closable with said solenoid mechanism.

6. A control system according to claim 5, wherein:
said first electro-magnetic valve provides said input pressure thereof and an inner pressure of said hydraulic chamber when said spool valve mechanism is opened and closed, respectively.

7. A control system according to claim 4, wherein:
said second electro-magnetic valve comprises a solenoid mechanism which is energized in response to said control signal, and a spool valve mechanism actuatable to open and close with said solenoid mechanism;
said spool valve mechanism comprises a spool member, a spring member normally biasing one end face of said spool member in the open direction of said spool valve mechanism, and a hydraulic chamber defined by the other end of said spool member; and
said hydraulic chamber has a first orifice adapted to introduce an input pressure of said second electro-magnetic valve and to be closed when said spool valve mechanism is opened and closed, respectively, and a second orifice communicating with atmospheric pressure and closable with said solenoid mechanism.

8. A control system according to claim 7, wherein:
said second electro-magnetic valve conducts downstream thereof an upstream pressure, when said spool valve mechanism is opened, and introduces said upstream pressure to said hydraulic chamber and releases a downstream pressure thereof, when said spool valve mechanism is closed.

9. A control system according to claim 5 or 7, wherein:
said first orifice is formed in said spool member; and
said second orifice is formed through a valve seat member adapted for seating said spool member when said spool valve mechanism is opened.

10. A control system according to claim 3, wherein:
said signal processing circuit comprises a plurality of first logic circuits having preset vehicle speeds particular thereto, each of said first logic circuits providing a first logic signal at a "low" level when a running vehicle speed represented by the vehicle speed signal is lower than corresponding one of said preset vehicle speeds and at a "high" level when a running vehicle speed is higher than said corresponding preset vehicle speed, at least one second logic circuit for providing a second logic signal at either of "high" or "low" in accordance with the shift position signal, at least one third logic circuit for outputting a third logic signal at either of "high" or "low" level in accordance with the throttle opening signal, and a logic processing circuit for logically processing said first logic signal, said second logic signal and said third logic signal for generating said control signal.

11. A control system according to claim 10, wherein:
said logic citrcuits comprise a plurality of inverters and a plurality of NAND gates.

12. A control system according to claim 10, the shift lever having first, second and third positions, wherein:
said second logic signal takes either a "high" or a "low" level for both of the first and second speed positions, and the opposite level thereof for the third speed position.

13. A control system according to claim 12, wherein:
said electro-magnetic valve means comprises a first electro-magnetic valve connected with the hydraulic pressure source and adapted for providing a predetermined high pressure when opened and a predetermined low pressure when closed, and a second electro-magnetic valve connected in series with said first electro-magnetic valve and adapted for effecting an on-off control;
said preset vehicle speeds are at least three in number; and
said logic processing circuit operates such that it renders,
when said running vehicle speed is lower than the lowest one of said three preset vehicle speeds, said first electro-magnetic valve and said second electro-magnetic valve both closed,
when said running vehicle speed is between said lowest one and the intermediate one of said three preset vehicle speeds, said second electro-magnetic valve open for both of the first and second speed positions and closed for the third speed position,
when said running vehicle speed is between said intermediate one and the highest one of said three preset vehicle speeds, both of said electro-magnetic valve for both of the first and second speed positions and said second electro-magnetic valve for the third speed position, and
when said running vehicle speed is higher than said highest one of said preset vehicle speeds, said first electro-magnetic valve and said second electro-magnetic valve both open irrespective of the shift position.

14. A control system according to claim 13, wherein:
said preset vehicle speeds include a fourth preset vehicle speed higher than any one of said three preset vehicle speeds; and
said second electro-magnetic valve becomes open when the degree of opening of the throttle valve resides within a preset range, while said running vehicle speed is lower than said fourth preset vehicle speed, and irrespective of the degree of opening of the throttle valve, while said running vehicle speed is higher than said fourth preset vehicle speed.

* * * * *